(12) United States Patent
Macholdt et al.

(10) Patent No.: US 6,506,221 B1
(45) Date of Patent: Jan. 14, 2003

(54) PROCESS FOR PREPARING PURIFIED DYESTUFFS

(75) Inventors: Hans Tobias Macholdt, Darmstadt-Eberstadt (DE); Dominique Pflieger, Tagsdorf (FR)

(73) Assignee: Clariant Finance (BVI) Limited, Tortola (VG)

( * ) Notice: Subject to any disclaimer, the term of this patent is extended or adjusted under 35 U.S.C. 154(b) by 238 days.

(21) Appl. No.: 09/587,130

(22) Filed: Jun. 2, 2000

(30) Foreign Application Priority Data

Jun. 1, 1999 (GB) .............................................. 9912482

(51) Int. Cl.⁷ .............................................. C09B 67/00
(52) U.S. Cl. ......................... 8/609; 8/611; 8/685; 8/938
(58) Field of Search ............................ 8/685, 938, 609, 8/611

(56) References Cited

U.S. PATENT DOCUMENTS 3,809,533 A  *  5/1974  Sievenpiper
4,180,502 A  *  12/1979  Kaufmann

FOREIGN PATENT DOCUMENTS

| EP | 100043 | * | 2/1984 |
| GB | 1 062 256 |  | 3/1967 |
| GB | 1 444 108 |  | 7/1976 |

* cited by examiner

*Primary Examiner*—Margaret Einsmann
(74) *Attorney, Agent, or Firm*—Anthony A. Bisulca

(57) ABSTRACT

The invention relates to a process for the preparation of a purified version of a solvent-soluble dyestuff, comprising the steps of (a) mixing an aqueous presscake of the dyestuff into a water-miscible liquid; and (b) distilling off the water until a water content of 5% by weight maximum is attained; and (c) filtering the dyestuff composition comprising solvent-soluble dyestuff and water-miscible liquid, thereby removing all insoluble contaminants and (d) diluting the dyestuff composition comprising solvent-soluble dyestuff and water-miscible organic solvent in de-ionized water, thereby performing the precipitation of the solvent-soluble dyestuff which is then isolated after filtration and washing with de-ionized water This ink jet grade version has the important advantage of being virtually salt-free and solvent-free.

10 Claims, No Drawings

PROCESS FOR PREPARING PURIFIED DYESTUFFS

This invention relates to organic dyestuffs and more particularly to improved dyestuffs suitable for use in printing and imaging technologies, especially those suitable for coloration of substrates such as paper, plastics, textiles, metals and glass by printing processes such as Ink jet.

BACKGROUND OF THE INVENTION

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good water fastness, light fastness and optical density, have fast fixation to the substrate and cause no clogging of the nozzle.

Commercially available Solvent dyes usually exhibit a sulfate content of about 500 ppm and a chloride content of about 1000 ppm which salt content leads to the above mentioned clogging problems.

Therefore, a special quality of solvent dyes is needed to make sure that it contains no insoluble residues that may cause clogging of the nozzle.

It has now been found that an unusually high quality, especially a very low salt content, of solvent-soluble dyestuffs is attained by a process as hereinafter described.

SUMMARY OF THE INVENTION

There is provided, according to the present invention, a process for the preparation of a purified version of a solvent-soluble dyestuff, comprising the steps of (a) mixing an aqueous presscake of the dyestuff into a water-miscible liquid;

(b) distilling off the water until a water content of not more than 5% by weight is attained;

(c) filtering the dyestuff composition comprising solvent-soluble dyestuff and water-miscible liquid, thereby removing all insoluble contaminants and (d) diluting the filtered dyestuff composition in de-ionized water, thereby performing the precipitation of the solvent-soluble dyestuff which is then isolated after filtration and washing with de-ionized water.

This process yields an unusually low salt content quality of solvent dyes which shows no residues when dissolved in organic solvents which are commonly used for printing inks.

For example, an improved Solvent Black 27 has a sulfate level below 50 ppm and a chloride content of 150 ppm (measured by ion chromatography).

In GB 1,062,256 a similar process is described for purifying azo pigments which process is, however, not comparable as it concernes compounds which are insoluble in all solvents, i.e. it solves a different problem from the one described above. More specifically, step c) of the actual process of the invention is the reverse of the disclosed process (in which the pigments are filtered, decantated or centrifuged) and step d) of the actual process of the invention is not comparable with the optional washing step of the already isolated pigments in the disclosed process.

In GB 1,444,108 a process for preparing chromium complexes of metallisable dyestuffs is described which could be interpreted to be similar to the process of the invention when these chromium complexes are solvent-soluble. The described process, however, relates to the preparation of the complexes, i.e. the reaction with chromium compounds, and the obtained solution is evaporated as a final step. In other words, the critical step d) of the process of the invention is missing.

Any solvent-soluble dyestuffs known in the art may be treated according to the process of the present invention, particularly dyestuffs of the 1:2-metal complex type, more particularly when the metal is chromium, cobalt, iron or aluminum. Examples of preferred dyestuffs are:

C.I. Solvent Black 27, C.I. Solvent Black 45, C.I. Solvent Black 29, C.I. Solvent Blue 44, C.I. Solvent Brown 28, C.I. Acid Violet 66, C.I. Solvent Orange 41, C.I. Solvent Orange 62, C.I. Solvent Red 8, C.I. Solvent Red 89, C.I. Solvent Red 91, C.I. Solvent Red 92, C.I. Solvent Red 122, C.I. Solvent Red 124, C.I. Solvent Red 127, C.I. Solvent Yellow 83, C.I. Solvent Yellow 83:1, C.I. Solvent Yellow 62, C.I. Solvent Yellow 79.

The water-miscible liquid which is used in step (a) may be any high boiling water-miscible organic solvent known to the art having boiling points higher than 110° C., preferably higher than 115° C., under atmospheric pressure. Blends of solvents may also be used. Typical classes of solvents are, for example, alkanols, ethers and ketones, preferably propylene glycols and tetrahydrofurfuryl alcohol. An especially preferred class are glycol ethers, from the point of view of both performance and environmentally innocuousness. Particularly preferred are the dialkylene glycol monoalkyl ethers, most particularly dipropylene glycol monomethyl ether.

The aqueous presscake which is used in step (a) may have a water content of 20 to 80% by weight, preferably of 40 to 60% by weight.

The process of the invention comprises, first of all, mixing the aqueous presscake into the water-miscible liquid. The amount of said liquid may be the 0.5 to 10 fold amount (by weight) relative to the aqueous presscake.

The mixing may be done by breaking up the presscake into suitably-sized fragments and stirring them into the solvent, with heating if necessary. When this has been done, the temperature of the mixture is raised to a temperature at which water may be readily distilled off. The optimum temperature will vary, depending on the solvent and the quantity of water, but is expediently from 110 to 180° C., preferably from 130 to 160° C. The distillation is continued until the water content of the mixture drops below 5%.

This process allows the colorant to be entirely dissolved in the solvent, whereas the insoluble contaminants remain undissolved and may even settle on the bottom of the reactor depending on their quantity. These insolubles are then removed by a filtration process where a filter aiding agent, e.g. filter earth, can be used if necessary. The clarified solution of the colorant is then poured into a large excess, e.g. a 5 to 20 fold excess (by weight), of de-ionized water under vigorous stirring to make sure that the colorant precipitates as a solid which can be easily recovered by filtration from the reaction mixture. The resulting cake is finally washed until solvent free with de-ionized water before being dried and ground.

An improved quality, especially a very low salt content (below 500 ppm), of solvent dyes is thereby obtained which shows no residues when dissolved in organic solvent which are commonly used for printing inks. A further advantage of the obtained solvent dyes is the absence of any solvent which could interfere in the preparation of ink compositions.

Solvent based ink compositions are used where fast drying times are required and particularly when printing onto hydrophobic substrates such as plastics, metal or glass. For this application, the solvent is preferably selected from ketones, alkanols, aliphatic hydrocarbons, esters, amides or mixtures thereof. Where an aliphatic hydrocarbon is used as the solvent, a polar solvent such as alcohol, ester, ether or amide is preferably added. Preferred solvents include ketones, especially methyl ethyl ketone and alkanols, especially ethanol and n-propanol.

Where the medium for an ink composition is a low melting point solid the melting point of the solid is preferably in the range from 60° C. to 125° C. Suitable low melting point solids include long chain fatty acids and alcohols, preferably those with $C_{18-20}$ chains or sulphonamides. The dyes may be dissolved in the low melting point solid or may be finely dispersed in it.

Therefore, these dyestuffs are also suited for use in color filters and in toner resins. A preferred toner resin is a styrene or substituted styrene polymer or copolymer such as polystyrene or styrene-butadiene copolymer, especially a styrene-acrylic copolymer such as a styrene-butyl methacrylate copolymer. Other suitable toner resins include polyester, polyvinylacetate, polyalkenes, polyvinylchloride, polyurethanes, polyamides, silicones, epoxyresins and phenolic resins.

These improved dyestuffs are also suited for inks based on micro-emulsion systems such as described in EP 0 839 883 A2.

The invention is further illustrated by means of the following examples in which all parts are by weight.

EXAMPLE 1

Purification of C.I. Solvent Yellow 79 in Dipropylene Glycol Monomethyl Ether

A reactor equipped with a stirrer, heater and distillation column is charged with 1500 parts of dipropylene glycol monomethyl ether ("the solvent"), and the solvent is heated to 60° C. 1718 parts of an aqueous presscake of C.I. Solvent Yellow 79 (58.2% by weight dyestuff) is gradually added with stirring to the solvent. This mixture is heated with stirring to 150° C. and the mixture is distilled to remove water, a total of 734 parts being removed. The distillate is about 90% water and 10% solvent. There remains in the reactor a dark brown solution of the dyestuff, containing 40% by weight dyestuff, 55% solvent, 4% water plus about 1% of insoluble material which settles on the bottom of the flask while the mixture is allowed to cool down. 125 parts of filter earth is then added under stirring before the solution is filtered through a sintered glass funnel (porosity: G3; diameter: 30 cm); thereby removing all insoluble contaminants. The clarified solution (2484parts) is then slowly added with stirring to a reactor charged with 25000 parts of de-ionized water. The purified colorant thereby precipitates as a crystalline product. The latter is isolated by filtering and the cake which remains on the filter is washed with another 50000 parts of de-ionized water to remove all traces of dipropylene glycol monomethyl ether. The colorant is then dried and ground in a very classical manner. The resulting purified dye is virtually salt free (salt content: 200 ppm) and can be used directly for ink compositions which causes no clogging when passing through filters and/or nozzles.

EXAMPLE 2–5

Example 1 is repeated, replacing the dyestuff used therein with the same weight of a presscake of each of the following dyestuffs:

Example 2 C.I. Solvent Black 45
Example 3 C.I. Solvent Blue 44
Example 4 C.I. Solvent Red 122
Example 5 C.I. Solvent Yellow 83:1

In each case, the result was a purified dye which was virtually salt free (salt content 200 ppm) and could be used as such in ink compositions which caused no clogging when passing through filters and/or nozzles.

What is claimed is:

1. A process for preparing an ink jet grade version of solvent-soluble dyestuffs, comprising
   (a) mixing an aqueous presscake of the dyestuff into a water-miscible liquid;
   (b) distilling off the water until a water content of not more than 5% by weight is attained;
   (c) filtering the dyestuff composition comprising solvent-soluble dyestuff and water-miscible liquid, thereby removing all insoluble contaminants;
   (d) diluting the filtered dyestuff composition in de-ionized water, thereby performing the precipitation of the solvent-soluble dyestuff;
   (e) filtering the solvent-soluble dyestuff;
   (f) washing the solvent-soluble dyestuff with de-ionized water; and
   (g) isolating the solvent-soluble dyestuff.

2. The process as claimed in claim 1, wherein the solvent-soluble dyestuff is a 1:2-metal complex dyestuff.

3. The process as claimed in claim 2, wherein the metal in the 1:2-metal complex dyestuff is Cr, Co, Fe or Al.

4. The process as claimed in claim 1, wherein the water-miscible liquid of step (a) has a boiling point of higher than 110° C. under atmospheric pressure.

5. The process as claimed in claim 1, wherein the water-miscible liquid of step (a) is a propylene glycol, a dialkylene glycol monoalkyl ether or tetrahydrofurfuryl alcohol.

6. The process as claimed in claim 1, wherein the aqueous presscake used in step (a) has a water content of 20 to 80% by weight.

7. The process as claimed in claim 1, wherein in step (a) the amount of the water-miscible liquid, relative to the weight of the aqueous presscake is the 0.5 to 10 fold amount.

8. The process as claimed in claim 1, wherein in step (b) distillation is carried out at a temperature of from 110 to 180° C.

9. The process as claimed in claim 1, wherein the aqueous presscake used in step (a) has a water content of 40 to 60% by weight.

10. The process as claimed in claim 1, wherein in step (b) distillation is carried out at a temperature of from 130 to 160° C.

* * * * *